United States Patent [19] [11] Patent Number: 4,662,466
Eto et al. [45] Date of Patent: May 5, 1987

[54] STEERING FORCE CONTROLLER FOR A POWER STEERING APPARATUS

[75] Inventors: Kunihiko Eto, Toyota; Akihiro Ohno, Okazaki; Yutaka Mori, Toyokawa, all of Japan

[73] Assignee: Toyoda Koki Kabushiki Kaisha, Kariya, Japan

[21] Appl. No.: 777,787

[22] PCT Filed: May 21, 1985

[86] PCT No.: PCT/JP85/00278

§ 371 Date: Sep. 17, 1985

§ 102(e) Date: Sep. 17, 1985

[30] Foreign Application Priority Data

May 24, 1984 [JP] Japan ............... 59-106173

[51] Int. Cl.⁴ ............................................. B62D 5/06
[52] U.S. Cl. ................................................. 180/142
[58] Field of Search ............... 180/141, 142, 143, 132; 364/424, 425

[56] References Cited

U.S. PATENT DOCUMENTS 4,476,529 10/1984 Nakamura et al. ............. 180/142 X
4,552,240 11/1985 Takeshima et al. ................. 180/142

FOREIGN PATENT DOCUMENTS 57-209471 12/1982 Japan .
58-156454 9/1983 Japan ................... 180/142
58-161667 9/1983 Japan ................... 180/142
58-209655 12/1983 Japan ................... 180/142
59-48264 3/1984 Japan .

Primary Examiner—John J. Love
Assistant Examiner—Charles R. Watts
Attorney, Agent, or Firm—Oblon, Fisher, Spivak, McClelland & Maier

[57] ABSTRACT

An electronically controlled power steering apparatus wherein the steering force generated by a power cylinder (15) is controlled by a microcomputer (54). Detection signals from a vehicle speed sensor (50) and a steering angle sensor (51) are input to the microcomputer (54), which thus, reads out from a memory (60) stored control electric currents corresponding to detection signals in order to output the appropriate control electric currents. A solenoid valve (20) for controlling the communication between left and right chambers of the power cylinder (15) and another solenoid valve (30) for controlling the supply of pressurized fluid from a pump (16) to a servovalve (14) are driven in response to the control electric currents from the microcomputer (54). When the vehicle runs a predetermined distance or a predetermined time period after the supply of electric current, the microcomputer (54) decreases the control electric currents charged to the solenoid valves (20) and (30). Accordingly, even in a vehicle of the type wherein a neutral position of the steering (10) cannot be precisely detected unless the vehicle runs the predetermined distance or the predetermined time period after the supply of electric power, any uncomfortable or strange "feel" by the driver can be avoided.

5 Claims, 9 Drawing Figures

STEERING FORCE CONTROLLER FOR A POWER STEERING APPARATUS

BACKGROUND OF THE INVENTION

1. Field of the Invention

The present invention relates to a steering force controller for a power steering apparatus and particularly, to a steering force controller which electronically controls steering force in accordance with vehicle speed, steering rotational angle and so forth.

2. Discussion of Background

Recently, there has been developed a power steering apparatus utilizing a microcomputer. In this apparatus, a characteristic map of a predetermined control pattern is stored in a memory, and control inputs such as vehicle speed and steering rotational angle are input to the microcomputer. The microcomputer appropriately controls the steering force generated by a power cylinder, in accordance with these control inputs and the characteristic map.

For example, there is known an electronically controlled power steering apparatus of the type wherein the steering rotational angle is detected by providing an encoder secured to a steering shaft and by causing a counter to count up or down in response to the output of the encoder and in dependence upon the steering direction. In this apparatus, as the content of the counter for storing the steering rotational angle is lost due to an electric power loss, a steering rotational angle detected when the electric power is subsequently restored coincides with that as counted from the position where the steering is located at that time. Accordingly, it is necessary to detect a neutral position of the steering again and then, to modify the previously detected steering rotational angle to a steering rotational angle as counted from the neutral position. For example, in a detecting method utilizing the fact that most of the time the steering wheel is in a neutral position, the vehicle must run a considerable distance in order that the straight driving state or the neutral position of the steering can be precisely detected by sampling the output of the encoder each time of a unit driving distance or each unit driving time and by software processing the sampled data. Thus, the steering rotational angle so detected is unreliable at such a time that the vehicle has just begun to run after the supply of electric power. If the power assist were controlled based upon a signal indicative of a steering rotational angle which is detected in an early stage of driving, the operator would suffer a curious or unpleasant feeling.

SUMMARY OF THE INVENTION

The present invention is created to solve the foregoing problems, and the object of the present invention is to provide a steering force controller which when the vehicle has just been started, is capable of preventing a detection signal of steering rotational angle from having a large influence upon the control of power assist generated by an electronically controlled power steering apparatus.

A steering force controller according to the present invention includes steering force regulation means provided in a pressurized fluid circuit of power steering apparatus. The regulation means includes a solenoid and regulates the steering force generated by a power cylinder of the power steering apparatus, based upon the value of electric current applied to the solenoid. There is also provided a solenoid controller for applying to the solenoid a control electric current in response to signals from a vehicle speed detector and a steering angle detector and control means for reducing the control electric current to the solenoid. This control means reduces the control electric current to the solenoid until a time comes when a neutral position of the steering can be precisely detected after the supply of electric power.

In accordance with the present invention, at an early stage when the vehicle has just been started, the steering rotational angle has a small influence upon the steering force generated by the power cylinder. This can avoid that the driver suffers a curious or unpleasant feeling while the neutral position of the steering is not detected correctly at an early stage of driving.

Other objects, features and the attendant advantages of the present invention will be readily appreciated when the following embodiments are considered by reference to the accompanying drawings.

BRIEF DESCRIPTION OF DRAWINGS

The drawings show embodiments of the present invention, wherein.

DETAILED DESCRIPTION OF THE PREFERRED EMBODIMENT

Figure 1:
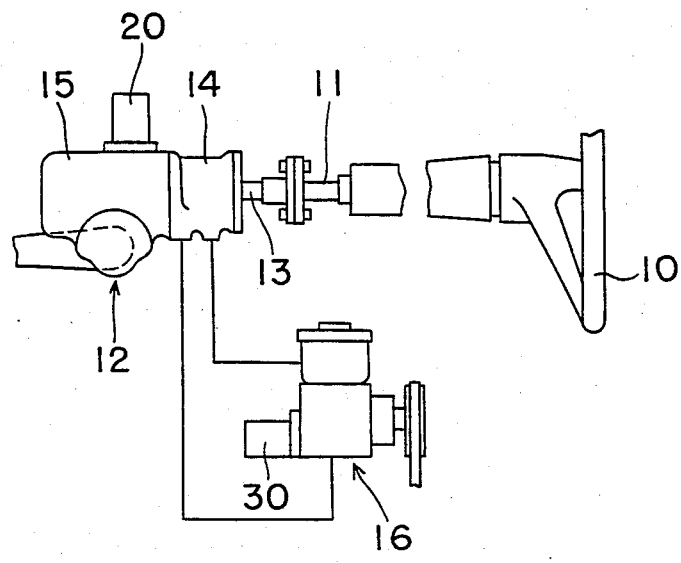
FIG. 1 is a view schematically illustrating a power steering apparatus.

An embodiment of the present invention employing two linear solenoid valves as steering characteristic regulation means will be described hereinafter. Referring to FIG. 1, a steering wheel 10 is secured to one end of a steering shaft 11, whose other end is connected to a steering rod 13 of a power steering apparatus 12. The power steering apparatus 12 comprises a servovalve 14 controllable by a manual steering torque applied to the steering rod 13 and a power cylinder 15 to which pressurized fluid is distributed under the control of the servovalve 14. A steering torque strengthened by the power cylinder 15 is transmitted to steerable wheels through a steering link mechanism (not shown). In order to supply the servovalve 14 of the power steering apparatus 12 with pressurized fluid, there is provided an engine-driven pump 16, the discharge volume of which is variably controlled by a flow volume control device referred to later.

Figure 2:
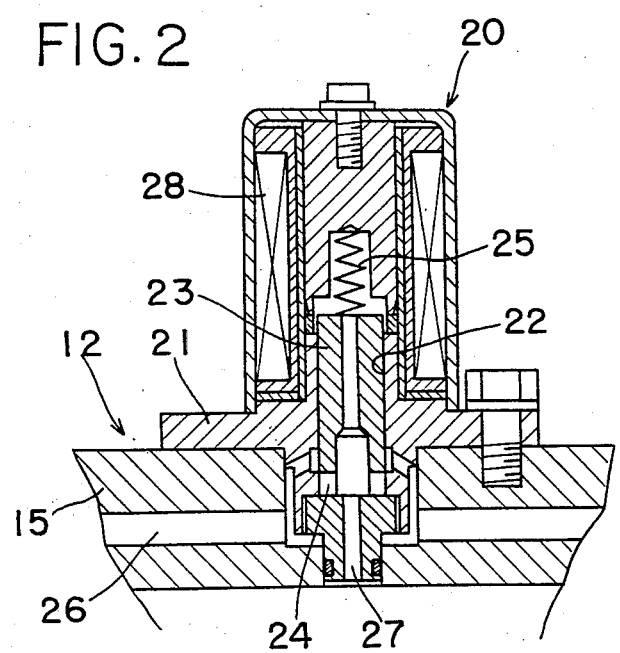
FIG. 2 is a sectional view of a linear solenoid valve for controlling the communication between opposite chambers of a power cylinder.

FIG. 2 shows linear solenoid valve 20 for controlling the communication between opposite chambers of the power cylinder 15 depending upon the variation in the vehicle speed and the like. A spool 23 is slidably received in a bore 22 formed in a valve body 21 and is formed with a bypass slit 24. The spool 23 being biased by a spring 25 is usually held at a lower position thereby to shut off the communication of a passage 26 leading to a left chamber of the power cylinder 15 with another passage 27 leading to a right chamber. However, when receiving an attractive force corresponding to the electric current charge of solenoid 28, the spool 23 is upwardly displaced against the spring 25. Thus, the passages 26 and 27 communicate with each other by way of the bypass slit 24, so that the steering force generated by the power cylinder 15 is varied depending upon the displacement amount of the spool 23, namely upon the value of electric current applied to the solenoid 28.

Figure 3:
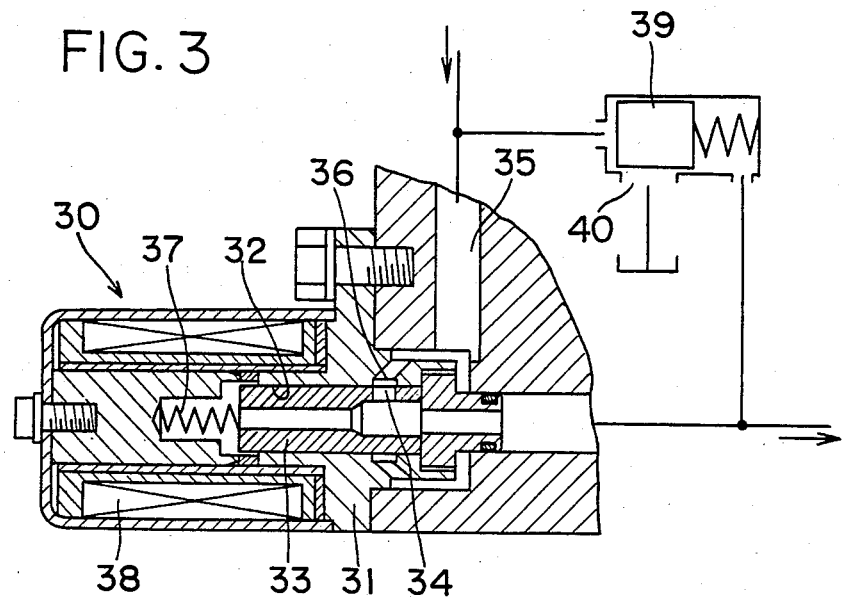
FIG. 3 is a sectional view of another linear solenoid valve for controlling the discharge fluid volume from a pump.

FIG. 3 shows a flow volume control device having a linear solenoid valve 30 for controlling the flow volume to be supplied to the servovalve 14. A spool 33 is slidably received in a bore 32 formed in valve body 31 and is formed with a control aperture 34. The aperture 34, together with a passage 35 leading to a discharge area in the pump 16, constitutes a variable throttle 36, through which the passage 35 communicates with the servovalve 14. The spool 33 being biased by a spring 37 is usually held at a sliding end as shown therein thereby to keep the opening area of the variable throttle 36 maximum. However, when an attractive force depending upon the value of electric current charged to the solenoid 38 is exerted on the spool 33, the same is displaced against the spring 37 to gradually decrease the opening area of the variable throttle 36.

A reference numeral 39 denotes a bypass valve for causing an excess part of pressurized fluid discharged from the pump 16, to be bypassed to the suction area. This bypass valve 39, responsive to the pressure difference across the variable throttle 36, controls the opening area of the bypass passage 40 to maintain the pressure difference always constant. Thus, the flow volume supplied to the servovalve 14 is reduced in proportion to the value of electric current charged to the solenoid 38.

Figure 4:
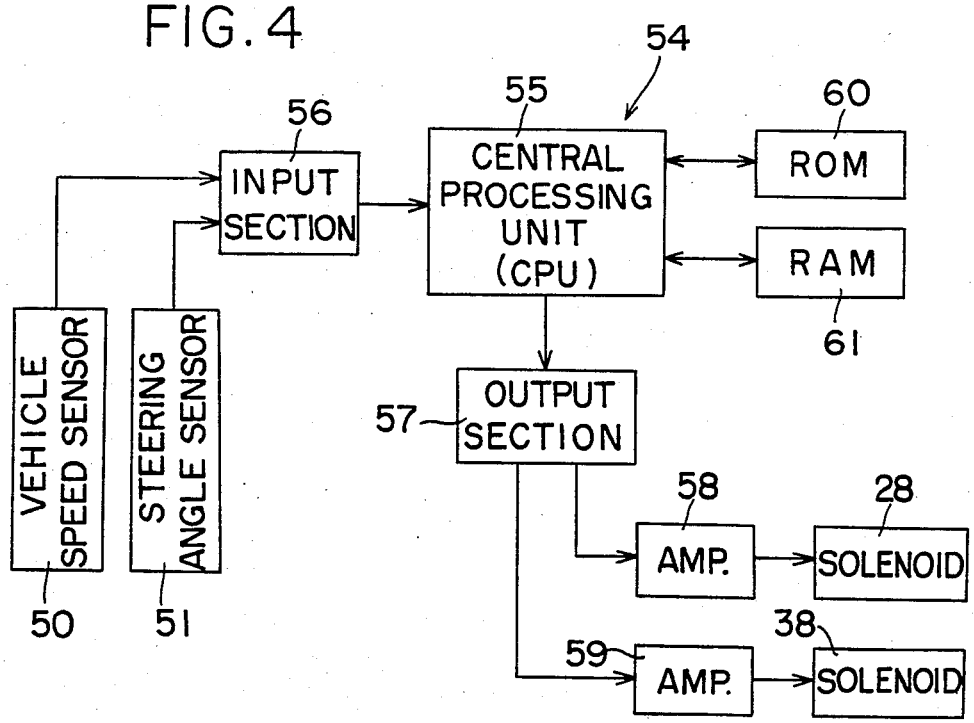
FIG. 4 is a block diagram of a controller for solenoids.

Referring now to FIG. 4 showing a controller for controlling the above-noted two solenoids 28 and 38, 50 denotes a vehicle speed sensor for detecting the vehicle speed V, and 51 denotes a rotational angle sensor for detecting the steering rotational angle $\theta$. The vehicle speed sensor 50 is of the type that sends out an output pulse each time the vehicle runs a unit distance, and the rotational angle sensor 51 is of the type that sends out an output pulse each time the steering 10 is turned a unit angle. The output pulses from these sensors 50, 51 are input to a solenoid control circuit composed of a microcomputer 54. The solenoid control circuit calculates the vehicle speed V by successively counting pulses each output from the vehicle speed sensor 50 at each unit time and also calculates the steering rotational angle by counting up or down the output pulses from the rotational angle sensor 51 depending upon the steering direction.

A reference numeral 55 designates a central processing unit (hereafter referred to as "CPU") of the microcomputer 54 for performing digital arithmetic processings, and 56, 57 respectively denote input and output sections thereof. The input section 56 forwards the input signals from the sensors 50, 51 to the CPU 55, while the output section 57 converts control signals from the CPU 55 into analogue values and outputs the converted analogue values from two output ports A, B thereof respectively to the two linear solenoid valves 38, 28 through amplifiers 59, 58. 60 designates a read-only memory (hereafter referred to as "ROM") for storing a fixed program as described later, and 61 designates a random access memory (hereafter referred to as "RAM") from and into which data is read and written.

Figure 5:
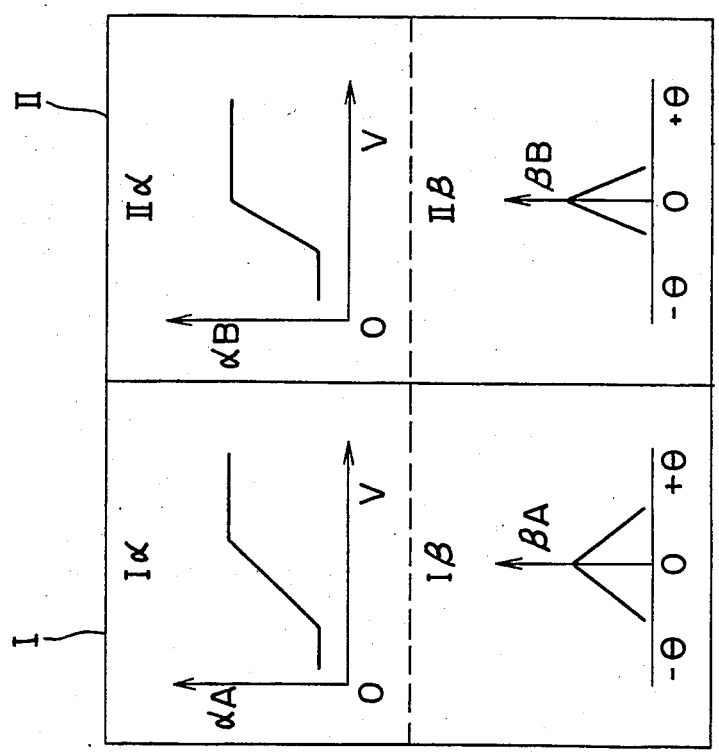
FIG. 5 is a representation diagrammatically showing programs for control electric currents.

FIG. 5 diagrammatically shows the fixed program stored in the ROM 60. This fixed program comprises two kinds of characteristic map sets I and II, each of which in turn comprises two characteristic maps I$\alpha$, I$\beta$ or II$\alpha$, II$\beta$. The characteristic maps I$\alpha$, II$\alpha$ are used for driving the solenoid of the linear solenoid valve 20 which controls the communication between the opposite chambers of the power cylinder 15, whereas the characteristic maps I$\beta$, II$\beta$ are used for driving the solenoid of the linear solenoid valve 30 which controls the flow volume to be supplied to the servovalve 14.

In each of the characteristic maps I$\alpha$, II$\alpha$, reference electric current values $\alpha$A, $\alpha$B are determined in relation to the vehicle speed V and are set to increase as the vehicle speed V increases. The characteristic maps I$\beta$, II$\beta$ are determined in relation to the steering rotational angle $\theta$ and decrease as the steering rotational angle $\theta$ increases.

Figure 6:
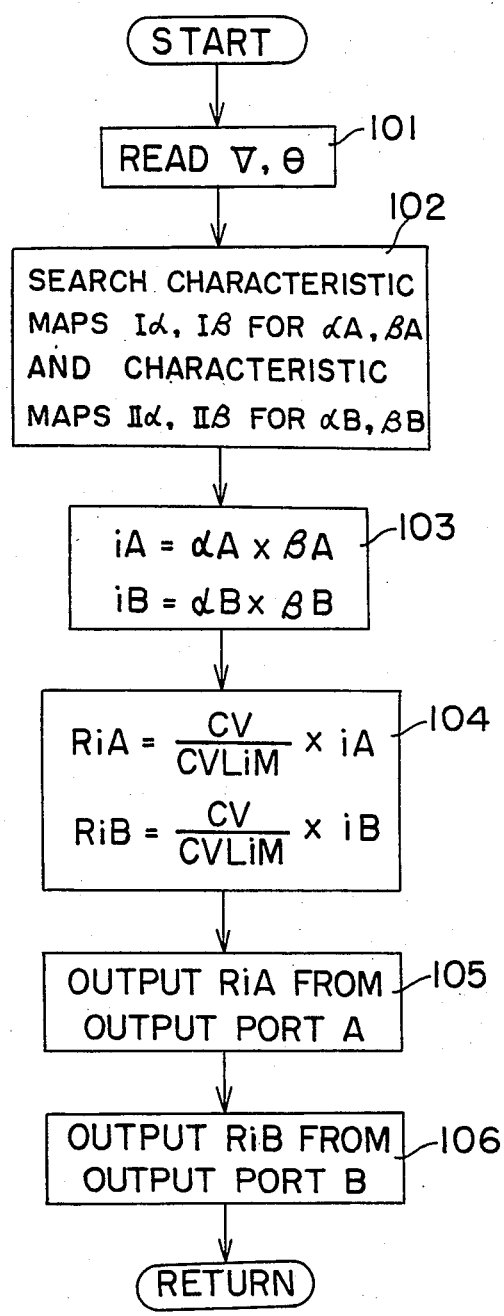
FIGS. 6 and 7 are flow charts of control programs.

A control program executed by the CPU 55 will now be described with reference to FIG. 6. Input signals from the vehicle speed sensor 50 and the rotational angle sensor 51 are input to the input section 56 of the microcomputer 54, and the vehicle speed V and the steering rotational angle $\theta$ are calculated based upon the input signals to be stored in the RAM 61.

With the starting of the program, the vehicle speed V and the steering rotational angle $\theta$ being stored in the RAM 61 are read out to be stored in a buffer register (not shown) of the CPU 55 in the first step 101. In step 102, the characteristic maps I$\alpha$, II$\beta$ of the fixed program shown in FIG. 5 are searched for reference electric current values $\alpha$A, $\beta$A respectively corresponding to the vehicle speed V and the steering rotational angle $\theta$, the characteristic maps II$\alpha$, II$\beta$ are searched for reference electric current values $\alpha$B, $\beta$B respectively corresponding to the vehicle speed V and the steering rotation angle $\theta$, and these reference electric current values $\alpha$A, $\beta$A, $\alpha$B and $\beta$B are stored in the memory. In step 103, an objective electric current value iA is calculated by multiplying the reference electric current values $\alpha$A, $\beta$A which have been searched from the characteristic maps I$\alpha$, I$\beta$, and another objective electric current value iB is calculated by multiplying the reference electric current values $\alpha$B, $\beta$B which have been searched from the characteristic maps II$\alpha$, II$\beta$. In next step 104, the objective electric current values iA and iB are multiplied by a function CV/CVLiM relating to the driving distance (this aspect will be described later) to obtain output electric current values RiA and RiB. Then, one of the output electric current values RiA is output from the output port A of the output section 57 (step 105) to be charged to the solenoid 28 of the linear solenoid valve 20. Further, the other output electric current value RiB is output from the output port B of the output section 57 (step 106) to be charged to the solenoid 38 of the linear solenoid valve 30. By controlling the output electric current values RiA and RiB input to the solenoids 28, 38 of the linear solenoid valves 20, 30 in this manner, the steering force can be controlled in relation to the vehicle speed V and the steering rotational angle $\theta$.

That is, in a high speed driving, the output electric current value RiA input to the solenoid 28 is increased and the output electric current value RiB input to the solenoid 38 is increased. This causes the discharge volume from the pump 16 to be reduced in one hand and the communication area between the opposite chambers of the pump 16 to increase on the other hand, whereby the steering becomes heavier to enhance the stability at high speed. In addition, during a straight driving, the discharge volume from the pump 16 is lowered to the minimum, thereby resulting in an increased stability of the steering at the neutral position as well as in a reduced power consumption.

Further, when the steering is turned without driving, the output electric current values RiA, RiB input to the solenoids 28, 38 are diminished. Thus, the communication area between the opposite chambers of the power cylinder 15 is diminished while the discharge volume from the pump 16 is increased, whereby the steering can be turned with a smaller manipulation force.

Figure 7:
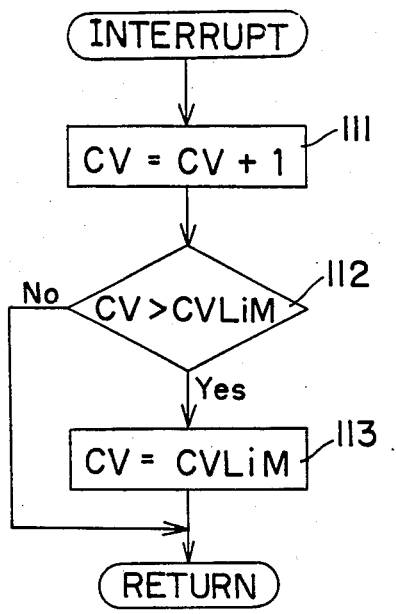

A control program for detecting the neutral position of the steering after the supply of electric power will be described hereafter with reference to FIG. 7. Each time the vehicle runs a unit distance after the supply of electric power, an output pulse is generated from the vehicle speed sensor 50 to output an interrupt signal. In response to this interrupt signal, 1 is added to a counter (provided in the CPU 55) CV for counting the drive distance in step 111. It is ascertained in step 112 whether the content of the distance counter CV is larger than a preset distance CVLiM, and in case of "No", the program return is effected. It is to be noted that the preset distance CVLiM is set sufficiently larger than a driving distance needed to precisely detect the neutral position of the steering. In this manner, each time an output pulse is generated from the vehicle speed sensor 50, an interrupt is applied to the CPU 55 to add 1 to the distance counter CV. During this time, a neutral position detection program not shown is processed in a parallel time relation thereto, and in accordance with this program, the output of a encoder which is provided in the input section 56 for detecting the steering rotational angle is sampled each time an output pulse is generated from the vehicle speed sensor 50. As a result, the neutral position of the steering can be detected based upon the sampled data.

When the vehicle runs the preset distance CVLiM, the content of the distance counter CV becomes larger than the set value CVLiM, so that the result of the ascertainment in step 112 changes to "Yes." In the next step 113, the content of the distance counter CV is made equal to the set value CVLiM, and the program return is then made.

Figure 8:
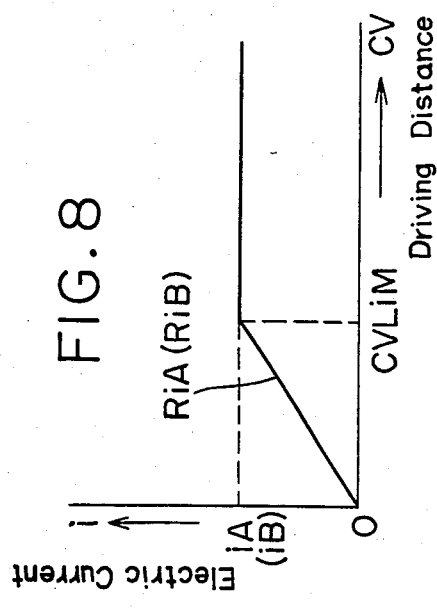
FIG. 8 is a graph showing the relation of driving distances to values of output electric currents.

Therefore, as clear from the arithmetic equation in step 104, before the driving distance reaches the set value CVLiM after the supply of electric power, the output electric current values RiA and RiB respectively hold those values to which the objective electric current values iA, iB are decreased at the rate (CV/CVLiM) of the driving distance to the preset value, as shown in FIG. 8. After the driving distance exceeds the set value CVLiM, the objective electric current values iA and iB are charged as the output electric current values RiA and RiB to the solenoids 28 and 38, respectively.

As a consequence, during the time required to detect the neutral position of the steering after the supply of electric power, electric current values to which the objective values calculated based upon the steering rotational angle $\theta$ have been lowered in accordance with the function relating to driving distance are charged to the solenoids 28 and 38, whereby it can be avoided that the operator suffer a curious or unpleasant feeling.

In another embodiment of the present invention, the output electric current values RiA and RiB charged to the solenoids 28 and 38 are controlled as functions of the objective values iA and iB relating to the driving time period. In this instance, a symbol CV in FIGS. 7 and 8 represents a time actually elapsed since the vehicle began to run subsequent to the supply of electric power, and a symbol CVLiM represents a time period long enough to detect the neutral position of the steering.

Figure 9:
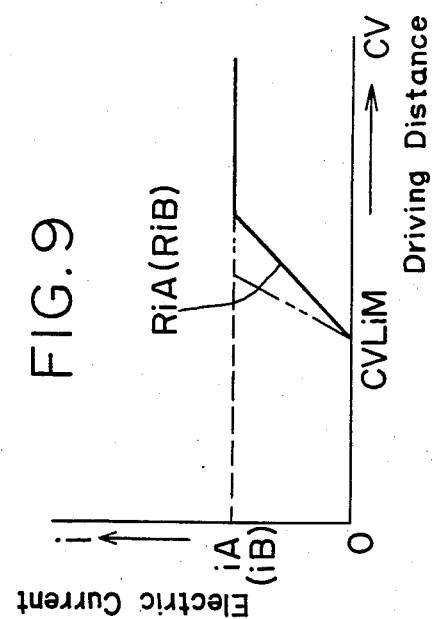
FIG. 9 is a graph showing another embodiment, but corresponding to that of FIG. 8.

FIG. 9 shows still another embodiment, wherein the output electric current values RiA and RiB are maintained to be zero (0) until the driving distance (or driving time) reaches the preset value CVLiM. From the stage wherein the driving distance exceeds the preset values CVLiM, the output electric current values RiA and RiB are gradually or rapidly approximated to the objective electric current values iA and iB, respectively. According to this embodiment, during the processing time required to detect the neutral position of the steering, the control based upon the vehicle speed V and the steering rotational angle $\theta$ is prevented from being performed thereby to obtain the maximum power assist.

Although the above-described embodiments use as the steering characteristic regulation means both of the linear solenoid valve 20 for controlling the communication between the opposite chambers of the power cylinder and the linear solenoid valve 30 for controlling the discharge volume from the pump 16, it is to be noted that the control of steering force can be practiced by the use of either of the linear solenoid valves 20 and 30. It is also to be noted that the steering force regulation means is not limited to the configuration as described above and may take various configurations for controlling the steering force by controlling electric current charged to a solenoid.

Further, although in the above-described embodiments, the solenoids are controlled based upon the vehicle speed and the steering rotational angle, they may be controlled based upon the steering rotational speed and the like.

We claim:

1. A steering force controller for a power steering apparatus having a pump, a power cylinder operatively connected to a steerable wheel, and a servovalve operated by a manual steering torque applied to a steering wheel for controlling the supply of pressurized fluid from said pump to said power cylinder, said steering force controller comprising steering force regulation means provided in a hydraulic circuit of said power steering apparatus and operable depending upon the value of electric current charged to solenoid means for regulating steering forces generated by said power cylinder, vehicle speed detection means, steering angle detection means for detecting the rotational angle of said steering wheel, said steering angle detection means requiring that a motor vehicle with said power steering apparatus must travel a predetermined distance to obtain a precise detection of a neutral position of said steering wheel, a solenoid control circuit coupled to said solenoid means, said vehicle speed detection means and said steering angle detection means for charging said solenoid means with an objective control current depending upon output signals from said vehicle speed detection means and said steering angle detecting means, and control means cooperating with said solenoid circuit for decreasing said control current charged to said solenoid means below the value of an objective control current which said solenoid means would be charged with if said motor vehicle traveled said predetermined distance after supply of electric power, so as to make said steering wheel easier to turn, until said motor vehicle travels said predetermined distance after supply of electric power.

2. A steering force controller as set forth in claim 1, wherein said control means comprises first control means for incrementing a parameter (CV) each time said motor vehicle travels a unit distance after the supply of said electric power, and second control means (104) for decreasing said objective control current which said solenoid control circuit (54) charges the solenoid means (28, 38) with, at a rate equal to the ratio of said parameter (CV) to a predetermined value (CVLiM), said predetermined value (CVLiM) representing a value that said parameter (CV) reaches when said motor vehicle travels said predetermined distance after the supply of said electric power.

3. A steering force controller as set forth in claim 2, wherein said control means further includes third control means for maintaining said parameter (CV) equal to said predetermined value (CVLiM) after said parameter (CV) reaches said predetermined value (CVLiM).

4. A steering force controller as set forth in claim 2, wherein said parameter (CV) incremented by said first control means represents a driving distance of said motor vehicle.

5. A steering force controller as set forth in claim 1, wherein said control means comprises first control means for incrementing a parameter (CV) each time said motor vehicle travels for a unit time period after the supply of said electric power, and second control means for decreasing said objective control current which said solenoid control circuit charges said solenoid means with, at a rate equal to the ratio of said parameter (CV) to a predetermined value (CVLiM, said predetermined value (CVLiM) representing a value that said parameter (CV) reaches when said motor vehicle travels said predetermined distance after the supply of said electric power.

* * * * *